US012709408B2

(12) United States Patent
Shimomori

(10) Patent No.: US 12,709,408 B2
(45) Date of Patent: Aug. 18, 2026

(54) PASSENGER BOARDING BRIDGE

(71) Applicant: SHINMAYWA INDUSTRIES, LTD., Takarazuka (JP)

(72) Inventor: Wataru Shimomori, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 732 days.

(21) Appl. No.: 17/920,920

(22) PCT Filed: May 12, 2020

(86) PCT No.: PCT/JP2020/018922
§ 371 (c)(1),
(2) Date: Oct. 24, 2022

(87) PCT Pub. No.: WO2021/229672
PCT Pub. Date: Nov. 18, 2021

(65) Prior Publication Data
US 2023/0202683 A1 Jun. 29, 2023

(51) Int. Cl.
*B64F 1/305* (2006.01)

(52) U.S. Cl.
CPC .................................... *B64F 1/305* (2013.01)

(58) Field of Classification Search
CPC .......... B64F 1/30; B64F 1/305; B64F 1/3055; B64F 1/31
USPC ................................................. 14/71.1, 72.5
See application file for complete search history.

(56) References Cited

U.S. PATENT DOCUMENTS

| | | | | |
|---|---|---|---|---|
| 5,505,237 | A * | 4/1996 | Magne | B64F 1/305 14/72.5 |
| 7,030,354 | B2 * | 4/2006 | Oki | B64F 1/305 14/71.1 |
| 7,702,453 | B2 * | 4/2010 | Hutton | B64F 1/002 701/28 |
| 2003/0229955 | A1 * | 12/2003 | Savage | B64F 1/3055 14/71.5 |
| 2005/0198750 | A1 * | 9/2005 | Spencer | B64F 1/3055 14/71.5 |
| 2006/0288502 | A1 * | 12/2006 | Hutton | B64F 1/305 14/71.5 |

(Continued)

FOREIGN PATENT DOCUMENTS

JP 4306937 B2 8/2009

*Primary Examiner* — William V Gilbert
(74) *Attorney, Agent, or Firm* — Alleman Hall LLP

(57) ABSTRACT

A passenger boarding bridge is capable of avoiding docking by backward travel of travel wheels. The passenger boarding bridge includes: a rotunda connected to an entrance of a terminal building and supported to be rotatable horizontally; an extendable and retractable tunnel unit whose proximal end is connected to the rotunda; a cab provided at a distal end of the tunnel unit; travel wheels configured to travel forward and backward in changeable directions; an operating device that is operated to input an operation command to the travel wheels; and a determiner configured to, during a period from when the cab starts being moved from a predetermined position, until the cab is docked with an aircraft, while the travel wheels are traveling backward, perform determination whether or not there is a possibility that the cab will come closer to the aircraft to get docked with the aircraft.

11 Claims, 7 Drawing Sheets

(56) References Cited

U.S. PATENT DOCUMENTS

2007/0277333 A1* 12/2007 Connelly ................ B64F 1/305
14/71.3
2008/0098538 A1* 5/2008 Hutton .................. B64F 1/3055
14/71.5
2009/0217468 A1* 9/2009 Anderberg ............ B64F 1/3055
14/71.5
2015/0353207 A1* 12/2015 Cox .......................... B64F 1/00
14/71.1
2021/0214103 A1* 7/2021 Casado Merino ...... B64F 1/002

* cited by examiner

PASSENGER BOARDING BRIDGE

TECHNICAL FIELD

The present invention relates to a passenger boarding bridge.

BACKGROUND ART

At an airport, a passenger boarding bridge that connects between a terminal building and an aircraft is often used for boarding onto and disembarking from the aircraft (see Patent Literature 1, for example).

Patent Literature 1 discloses that an operator operates a passenger boarding bridge by operating operation switches and an operating lever that are provided on an operating device (a control panel).

For example, the passenger boarding bridge includes: a rotunda connected to an entrance of a terminal building and supported in a horizontally rotatable manner; a tunnel unit whose proximal end is connected to the rotunda, the tunnel unit including a plurality of tunnels that are fitted together in a telescopic manner, such that the tunnel unit is extendable and retractable; a cab rotatably provided at the distal end of the tunnel unit and docked with an entrance (door) of an aircraft; and drive columns provided at the distal side of the tunnel unit, the drive columns serving as support legs. The drive columns include a lifting/lowering device and a travel device. The lifting/lowering device moves the tunnel unit upward/downward. The travel device is provided below the lifting/lowering device. The travel device includes a pair of travel wheels, each of which can be independently driven to rotate in regular and reverse directions. The travel device is configured to travel forward, travel backward, and change the travel direction, by the driving of the travel wheels.

CITATION LIST

Patent Literature

PTL 1: Japanese Patent No. 4306937

SUMMARY OF INVENTION

Technical Problem

Currently, it is often the case that docking the passenger boarding bridge configured as above with an aircraft, and undocking the passenger boarding bridge from the aircraft, are manually controlled through operations of an operating device by an operator. Usually, in the case of docking the passenger boarding bridge with the aircraft, the operator performs operations to cause the travel wheels to travel forward, thereby docking the distal-end cab of the passenger boarding bridge with the door of the aircraft. Then, in the case of undocking the passenger boarding bridge from the aircraft, the operator performs operations to cause the travel wheels to travel backward, thereby undocking and returning the passenger boarding bridge to a predetermined standby position.

In the above cases where the docking and undocking are controlled through operations performed by the operator, the docked state of the passenger boarding bridge with the aircraft depends on the skill of the operator. Some operator may dock the cab with the aircraft by backward travel of the travel wheels. In such a case, in order to undock the passenger boarding bridge from the aircraft, the operator needs to cause the travel wheels to travel forward. However, there may be a case where the undocking operation is performed by a different operator from an operator having performed the previous docking operation. In such a case, at the time of undocking, if the operator is unaware of the current state (i.e., current docked state), there is a risk that the operator causes the travel wheels to travel backward as he or she would do so in normal undocking, and as a result, the undocking from the aircraft is hindered.

Also, there may be a case where the distal end of the cab is provided with a limit switch that detects docking of the cab with an aircraft, and when the limit switch has detected that the cab has been docked with the aircraft, forward travel of the travel wheels is prohibited. In such a case, if an operator has docked the cab with the aircraft by backward travel of the travel wheels, then the travel wheels cannot be caused to travel forward. That is, the cab cannot be undocked from the aircraft through operations of the operating device by the operator.

The present invention has been made to solve the above-described problems. An object of the present invention is to provide a passenger boarding bridge capable of avoiding a situation where a cab thereof is docked with an aircraft by backward travel of travel wheels.

Solution to Problem

In order to achieve the above object, a passenger boarding bridge according to one aspect of the present invention includes: a rotunda connected to an entrance of a terminal building and supported such that the rotunda is rotatable horizontally; a tunnel unit whose proximal end is connected to the rotunda, the tunnel unit being extendable and retractable; a cab provided at a distal end of the tunnel unit, the cab being configured to be docked with an aircraft; a travel device that supports the tunnel unit and includes travel wheels configured to travel forward and backward, the travel device being configured such that a direction of forward travel of the travel wheels and a direction of backward travel of the travel wheels are changeable; an operating device that is operated to input an operation command to the travel device; and a determiner configured to, during a period from when the cab starts being moved from a predetermined position, the cab being moved through an operation of the operating device to cause the travel wheels to travel, until the cab is docked with the aircraft, while the travel wheels are traveling backward in accordance with an input of a backward travel operation command from the operating device, perform determination whether or not there is a possibility that the cab comes closer to the aircraft to get docked with the aircraft as a result of the travel wheels traveling backward.

According to the above configuration, during the period from when the cab starts being moved from the predetermined position until the cab is docked with the aircraft, while the travel wheels are traveling backward, the determiner performs the determination whether or not there is a possibility that the cab comes closer to the aircraft to get docked with the aircraft. In a case where a result of the determination indicates that there is a possibility that the cab comes closer to the aircraft to get docked with the aircraft, docking of the cab with the aircraft by the backward travel of the travel wheels can be avoided by, for example, giving a warning to an operator and/or restricting the backward travel of the travel wheels.

The determiner may be configured to: while the travel wheels are traveling backward, calculate, multiple times sequentially, a coordinate value of a current position of a predetermined part of one of the tunnel unit, the cab, or the travel device by using an orthogonal coordinate system whose origin is a position of a rotational center of the rotunda in a plan view; and perform the determination based on a change in the coordinate value of the current position of the predetermined part, the coordinate value being calculated multiples times sequentially.

As the orthogonal coordinate system, an XY orthogonal coordinate system whose origin is the position of the rotational center of the rotunda in a plan view may be preset such that, in the XY orthogonal coordinate system, regions that are located on an opposite side of the origin from the entrance of the terminal building are a first quadrant and a second quadrant. The determiner may be configured to: in a case where an entrance, of the aircraft, with which the cab is to be docked is scheduled to be located in the first quadrant, while the travel wheels are traveling backward, calculate, multiple times sequentially, a Y coordinate value of the current position of the predetermined part of one of the tunnel unit, the cab, or the travel device by using the XY orthogonal coordinate system; and perform the determination whether or not there is a possibility that the cab comes closer to the aircraft to get docked with the aircraft based on whether or not the Y coordinate value of the current position, the Y coordinate value being calculated multiple times sequentially, increases.

The determiner may be configured to: in a case where the entrance, of the aircraft, with which the cab is to be docked is scheduled to be located in the second quadrant, while the travel wheels are traveling backward, calculate, multiple times sequentially, an X coordinate value of the current position of the predetermined part by using the XY orthogonal coordinate system; and perform the determination whether or not there is a possibility that the cab comes closer to the aircraft to get docked with the aircraft based on whether or not the X coordinate value of the current position, the X coordinate value being calculated multiple times sequentially, decreases.

As the orthogonal coordinate system, an XY orthogonal coordinate system whose origin is the position of the rotational center of the rotunda in a plan view may be preset such that, in the XY orthogonal coordinate system, regions that are located on an opposite side of the origin from the entrance of the terminal building are a first quadrant and a second quadrant. The determiner may be configured to: in a case where an entrance, of the aircraft, with which the cab is to be docked is scheduled to be located in the second quadrant, while the travel wheels are traveling backward, calculate, multiple times sequentially, an X coordinate value of the current position of the predetermined part of one of the tunnel unit, the cab, or the travel device by using the XY orthogonal coordinate system; and perform the determination whether or not there is a possibility that the cab comes closer to the aircraft to get docked with the aircraft based on whether or not the X coordinate value of the current position, the X coordinate value being calculated multiple times sequentially, decreases.

The passenger boarding bridge may further include a distance sensor that is mounted to the cab and that measures a distance between the cab and the aircraft. The determiner may be configured to, while the travel wheels are traveling backward, perform the determination whether or not there is a possibility that the cab comes closer to the aircraft to get docked with the aircraft based on whether or not the distance between the cab and the aircraft, the distance being measured by the distance sensor, decreases.

The determiner may be configured to perform the determination when the distance between the cab and the aircraft is a predetermined distance or less.

The passenger boarding bridge may further include a warning unit configured to perform warning in a case where the determiner determines that there is a possibility that the cab comes closer to the aircraft to get docked with the aircraft.

According to the above configuration, in a case where it is determined that there is a possibility that the cab comes closer to the aircraft to get docked with the aircraft, docking of the cab with the aircraft by the backward travel of the travel wheels can be avoided by giving a warning to the operator by the warning unit. The warning notifies, for example, that backward travel or backward docking should not be performed.

The passenger boarding bridge may be configured to stop the travel wheels from traveling backward in a case where the determiner determines that there is a possibility that the cab comes closer to the aircraft to get docked with the aircraft.

According to the above configuration, in a case where it is determined that there is a possibility that the cab comes closer to the aircraft to get docked with the aircraft, docking of the cab with the aircraft by the backward travel of the travel wheels can be avoided by stopping the backward travel of the travel wheels.

Advantageous Effects of Invention

The present invention is configured as described above, and has an advantage of being able to provide a passenger boarding bridge capable of avoiding a situation where a cab thereof is docked with an aircraft by backward travel of travel wheels.

The above object, other objects, features, and advantages of the present invention will be made clear by the following detailed description of preferred embodiments with reference to the accompanying drawings.

DESCRIPTION OF EMBODIMENTS

Figure 1:
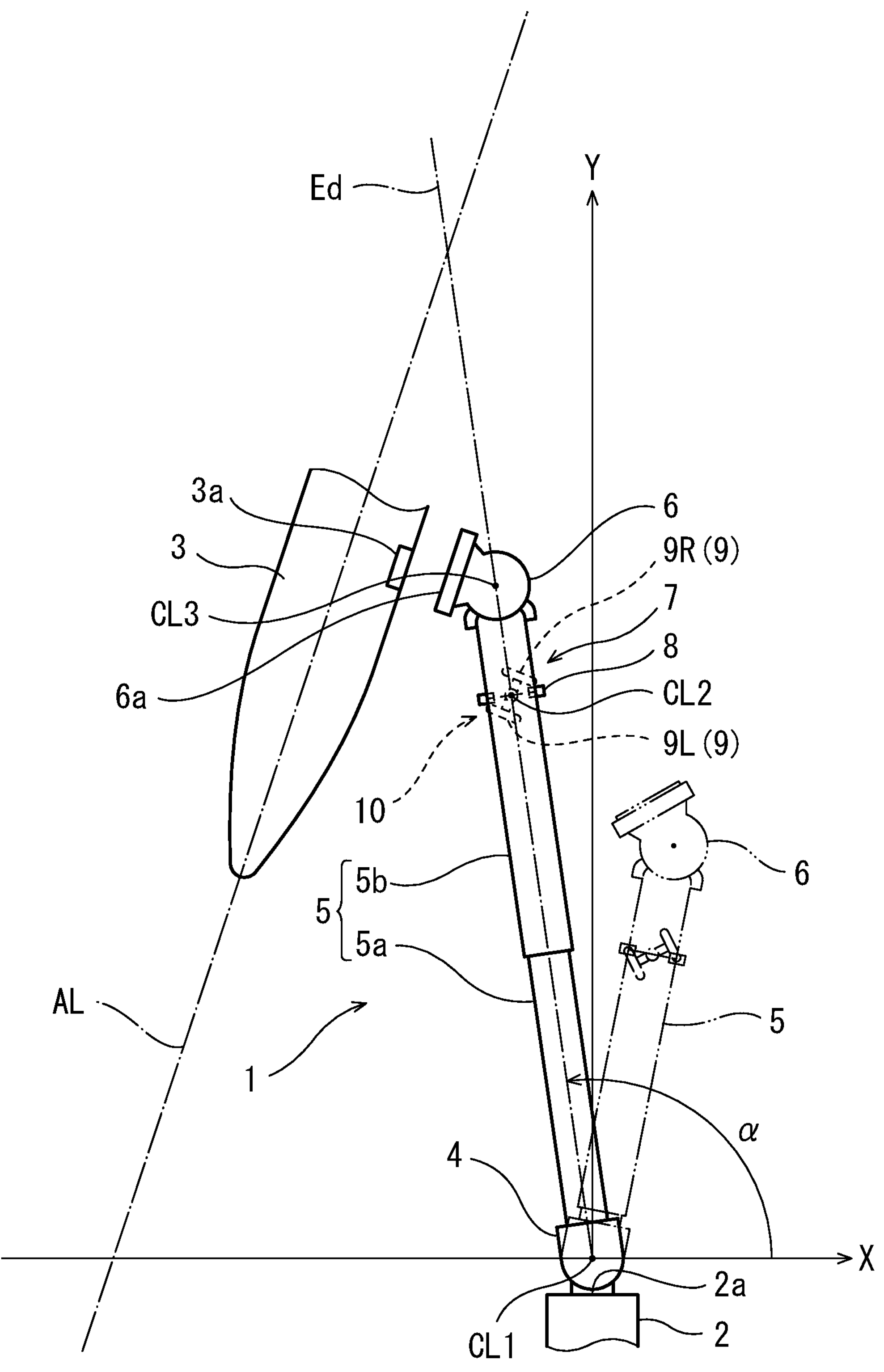
FIG. 1 shows a schematic plan view showing one example of a passenger boarding bridge according to one embodiment of the present invention.

Hereinafter, a preferred embodiment of the present invention is described with reference to the drawings. In the drawings, the same or corresponding elements are denoted by the same reference signs, and repeating the same descriptions is avoided below. The present invention is not limited to the embodiment described below.

Embodiment

Figure 2:
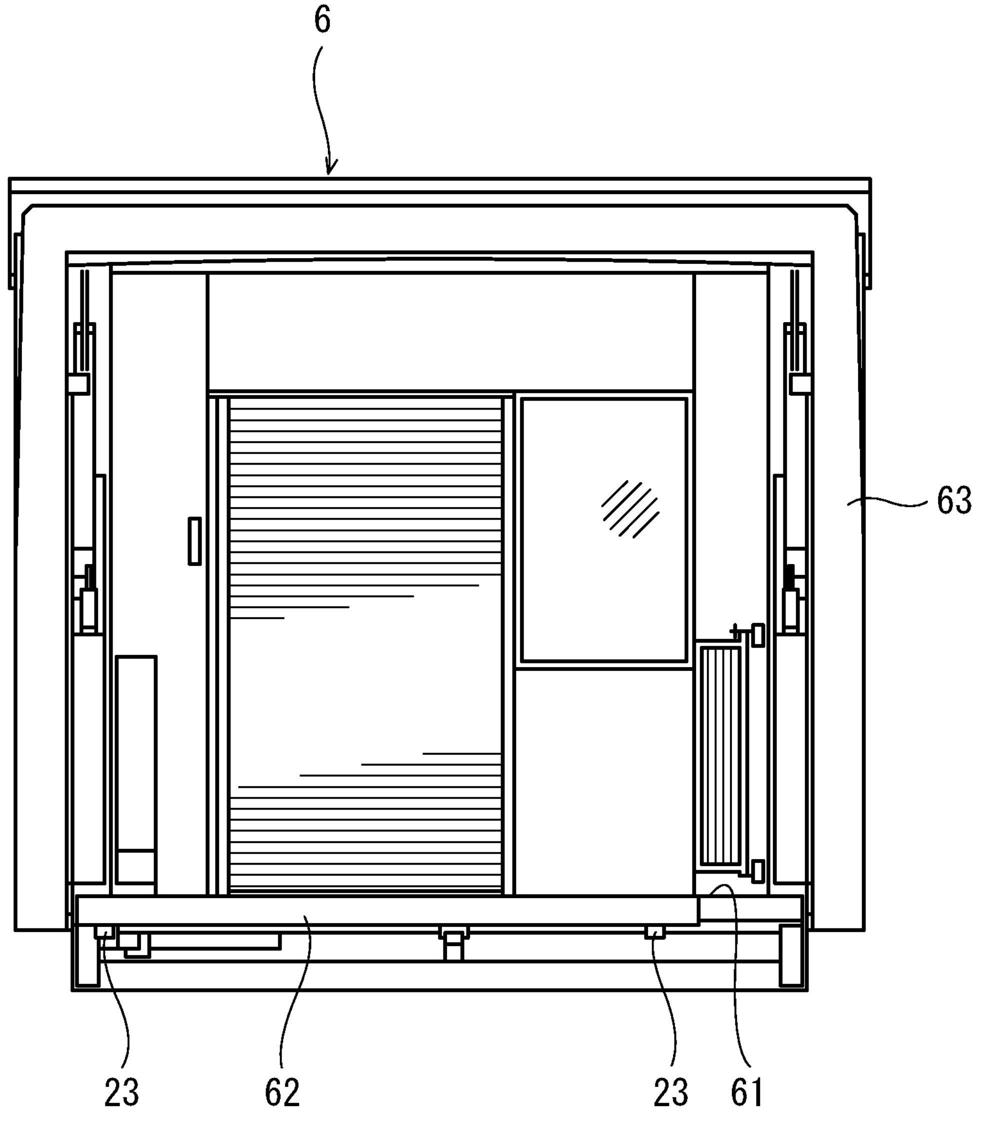
FIG. 2 is a front view of the distal end part of a cab to be docked with an aircraft.
Figure 3:
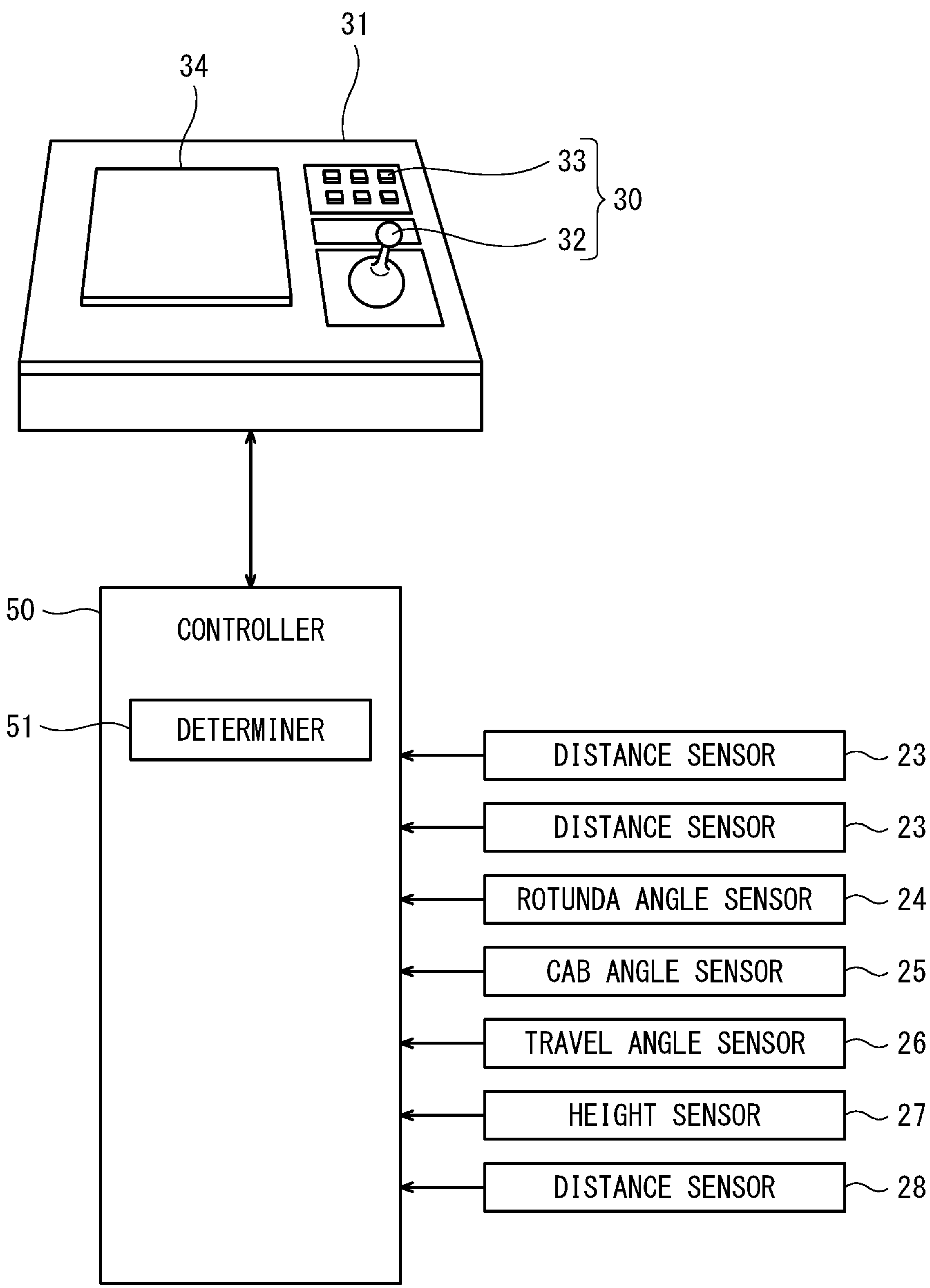
FIG. 3 shows one example of a control panel, etc.

FIG. 1 is a schematic plan view showing one example of a passenger boarding bridge according to the present embodiment. FIG. 2 is a front view of the distal end part of a cab to be docked with an aircraft (the front view is taken from the aircraft side). FIG. 3 shows one example of a control panel, etc.

A passenger boarding bridge 1 includes: a horizontally rotatable rotunda (proximal-end round room) 4 connected to an entrance 2*a* of a terminal building 2 of an airport; a tunnel unit 5, whose proximal end is connected to the rotunda 4; and a cab (distal-end round room) 6 provided at the distal end of the tunnel unit 5, such that the cab 6 is rotatable in regular and reverse directions. It should be noted that, for example, auxiliary stairs (not shown) that an operator or the like on the ground uses to get in and out of the cab 6 are set on the side of the tunnel unit 5.

The rotunda 4 is supported by a support pillar, such that the rotunda 4 is rotatable in regular and reverse directions about a rotational axis (vertical axis) CL1. The tunnel unit 5 forms a passenger walkway, and includes a plurality of tubular tunnels 5*a* and 5*b*, which are fitted together in a telescopic manner (nested manner), such that the tunnel unit 5 is extendable and retractable in the longitudinal direction. In the description herein, the tunnel unit 5 includes the two tunnels 5*a* and 5*b* as one example. The number of tunnels included in the tunnel unit 5 is not particularly limited, so long as the tunnel unit 5 includes two or more tunnels. The proximal end part of the tunnel unit 5 is connected to the rotunda 4 in such a manner that the tunnel unit 5 is swingable vertically.

The distal side of the tunnel unit 5 (specifically, the tunnel 5*b*, which is the frontmost tunnel) is provided with drive columns 7, which serve as support legs. The drive columns 7 are provided with a lifting/lowering device 8, which moves the cab 6 and the tunnel unit 5 upward and downward (i.e., lifts and lowers the cab 6 and the tunnel unit 5). By moving the tunnel unit 5 upward/downward by the lifting/lowering device 8, the cab 6 and the tunnel unit 5 can be swung vertically with respect to the rotunda 4.

The drive columns 7 are further provided with a travel device 10 including a pair of travel wheels 9 (a right travel wheel 9R and a left travel wheel 9L), which are drivable to rotate independently of each other in regular and reverse directions. The travel device 10 is provided below the lifting/lowering device 8. The travel device 10 is configured to travel forward by regular rotation of the two travel wheels 9, and to travel backward by reverse rotation of the two travel wheels 9. The travel device 10 is also configured to be rotatable in regular and reverse directions about a rotational axis CL2, such that the rudder angle is changeable within the range of −90 degrees to +90 degrees with respect to the extension/retraction direction (longitudinal direction) of the tunnel unit 5, and thus the travel direction of the travel device 10 is changeable. For example, by causing the two travel wheels 9 to rotate in opposite directions to each other, the travel direction (the facing direction of the travel wheels 9) can be changed on the spot.

By causing the travel device 10 (the travel wheels 9) to travel on the apron, the tunnel unit 5 can be rotated about the rotunda 4 and can be extended/retracted. At the time, since the rudder angle of the travel device 10 is changeable within the range of −90 degrees to +90 degrees with respect to the longitudinal direction of the tunnel unit 5, the tunnel unit 5 can be extended only by causing the travel device 10 (the travel wheels 9) to travel forward, and the tunnel unit 5 can be retracted only by causing the travel device 10 (the travel wheels 9) to travel backward.

The cab 6 is provided at the distal end of the tunnel unit 5. The cab 6 is configured to be rotatable, by an unshown rotational mechanism, in regular and reverse directions about a rotational axis CL3, which is perpendicular to the floor surface of the cab 6.

As shown in FIG. 2, a bumper 62 is provided at the distal end of a floor 61 of the cab 6 to be docked with an aircraft 3. A plurality of (in this example, two) distance sensors 23 (e.g., laser distance meters), each of which measures the distance between the cab 6 and the aircraft 3, are mounted to the bumper 62, such that the distance sensors 23 are arranged in the left-right direction of the bumper 62.

As shown in FIG. 2, a closure 63 is provided at the distal end part of the cab 6. The closure 63 includes a bellows portion that is expandable and contractible in the front-back direction. By docking the cab 6 with the aircraft 3 and expanding the bellows portion forward, the front end of the bellows portion can be brought into contact with the aircraft 3 around the entrance (door 3*a*) thereof.

As shown in FIG. 3, the passenger boarding bridge 1 further includes: a rotunda angle sensor 24, which detects a rotational angle of the rotunda 4; a cab angle sensor 25, which detects a rotational angle of the cab 6 with respect to the tunnel unit 5; a travel angle sensor 26, which detects a rotational angle of the travel device 10 with respect to the tunnel unit 5 (an angle indicating the travel direction of the travel device 10); a height sensor 27, which measures the amount of lifting/lowering of the tunnel unit 5 by the lifting/lowering device 8 and detects the height of the tunnel unit 5; and a distance sensor 28. These sensors are arranged at suitable positions, respectively. The distance sensor 28 is configured as, for example, a distance meter that detects the length of the tunnel unit 5. The distance sensor 28 is capable of calculating, based on its measurement value, for example, a distance from the center point of the rotunda 4 (the position of the rotational axis CL1) to the center point of the pair of travel wheels 9 (the position of the rotational axis CL2) and a distance from the center point of the rotunda 4 (the position of the rotational axis CL1) to the center point of the cab 6 (the position of the rotational axis CL3).

A control panel 31 as shown in FIG. 3 is provided inside the cab 6. The control panel 31 is provided with various operation switches 33 for performing operations of, for example, lifting/lowering the tunnel unit 5 and the cab 6 by the lifting/lowering device 8 and rotating the cab 6. The control panel 31 is further provided with: an operating lever 32 for operating the travel device 10; and a display device 34. The operating lever 32 is configured as a lever-shaped input device (i.e., a joystick) that has degrees of freedom multi-directionally. The operating lever 32 and the various operation switches 33 are included in an operating device 30. It should be noted that the configuration of the operating device 30 is modifiable as necessary.

A controller 50 and the control panel 31 are connected to each other via electrical circuitry. The controller 50 is configured to: receive inputs of information that is based on operations performed with the operating device 30, such as operation commands; receive inputs of, for example, output signals from the sensors 23 to 28; control the operations of the passenger boarding bridge 1; and output, for example, information to be displayed on the display device 34.

The controller 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. By executing the control program, the arithmetic processing unit functions as a controller that, for example, controls the operations of the components of the passenger boarding bridge 1 (the operations of, for example, the travel device 10, the lifting/lowering device 8, and the rotational mechanism of the cab 6), and also functions as, for example, a determiner 51 described below. It should be noted that information to be stored while the passenger boarding bridge 1 is in operation is also stored in the storage unit. The controller 50 may be configured as a single control device performing centralized control, or may be configured as a plurality of control devices performing distributed control in cooperation with each other via the Internet and LAN. For example, the cab 6 or the frontmost tunnel 5b is provided with the controller 50.

It should be noted that the control panel 31 configured to communicate with the controller 50 may be provided not in the cab 6, but at a position that is, for example, away from the passenger boarding bridge 1, and the control panel 31 may be configured to remote-control the passenger boarding bridge 1.

Next, one example of operations of the passenger boarding bridge 1 is described. Operations of the passenger boarding bridge 1 are realized by control performed by the controller 50.

Before the aircraft 3 arrives at the apron, the passenger boarding bridge 1 stands by at a predetermined standby position indicated by two-dot chain line of FIG. 1.

A regular stop position for the aircraft 3 is a predetermined position, at which the aircraft axis of the aircraft 3 is on a fuselage guide line AL, and the regular stop position is set in the extending direction of the fuselage guide line AL. The aircraft 3 is brought to a stop targeting the regular stop position. In FIG. 1, the aircraft 3 stops at the regular stop position, and the aircraft axis of the aircraft 3 is on the fuselage guide line AL, although, in reality, there are cases where an actual stop position of the aircraft 3 deviates from the regular stop position. It should be noted that the fuselage guide line AL is drawn on the apron.

Figure 6:
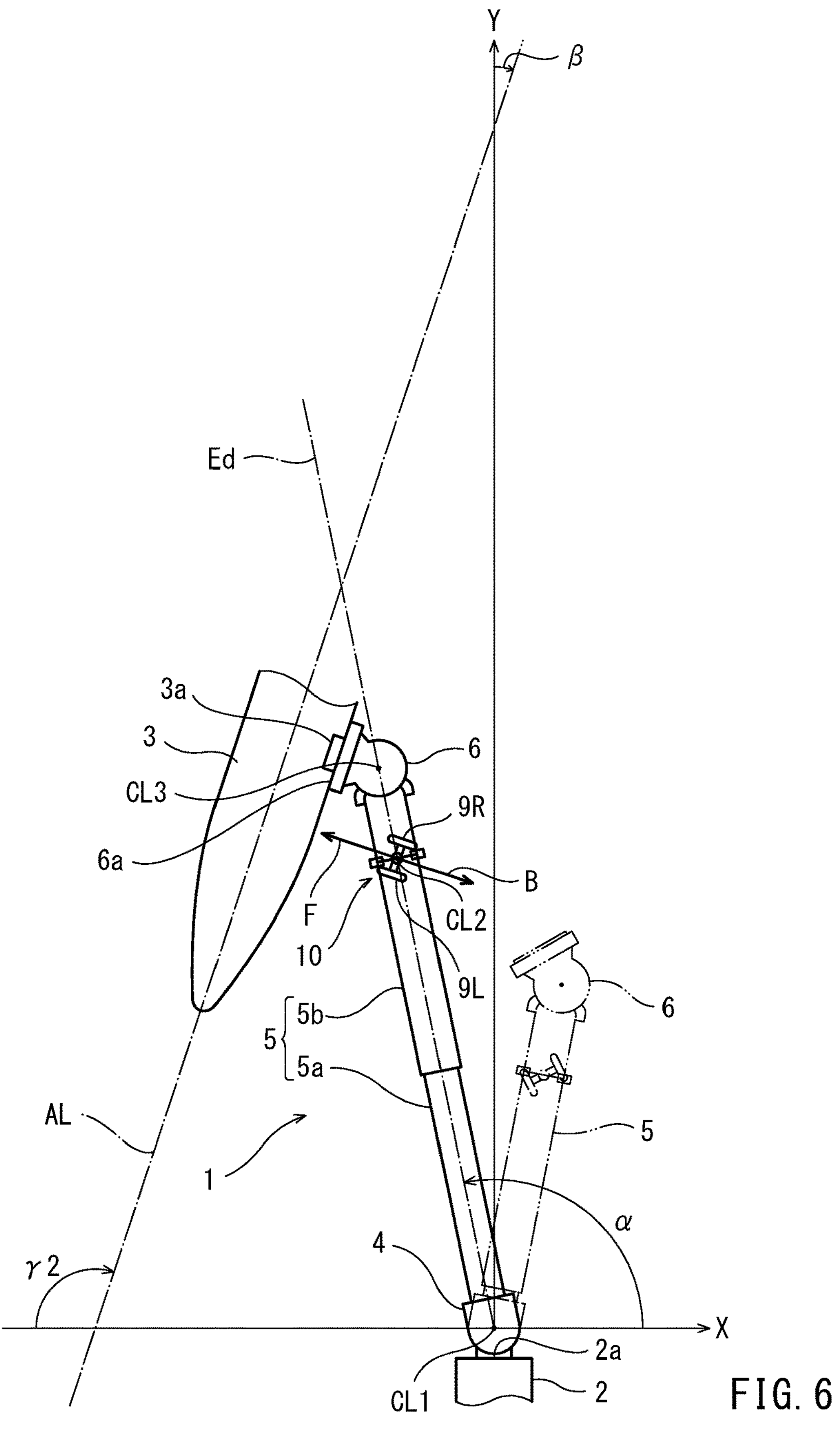
FIG. 6 is a schematic plan view showing one example where the passenger boarding bridge is in the state of being docked with the aircraft in a case where the door of the aircraft is located in a second quadrant.

In the case of docking the passenger boarding bridge 1 with the aircraft 3, an operator in the cab 6 operates the operating device 30 (the operating lever 32 and various operation switches 33) of the control panel 31 to move the passenger boarding bridge 1 standing by at the standby position indicated by two-dot chain line in FIG. 1, thereby docking the cab 6 with the door **3*a* of the aircraft 3 (e.g., see FIG. 6 showing the docked state). At the time, the operator sets, as a target position, for example, a position that is forward from the door 3*a*, which is an entrance of the aircraft 3, by an arbitrary distance (e.g., about 1 m). Then, the operator causes the travel device 10 to travel forward such that the cab 6 reaches the target position, and operates the lifting/lowering device 8 and the rotational mechanism of the cab 6 such that, at the target position, the bumper 62 of the distal end part of the cab 6 faces the door 3*a* of the aircraft 3. The passenger boarding bridge 1 being in a state where the cab 6 is at the target position (i.e., the passenger boarding bridge 1 being at the target position) is indicated by solid line in FIG. 1**.

Thereafter, the operator causes the travel device 10 to travel forward such that the cab 6 moves straight toward the door **3*a*, thereby docking the cab 6 with the door 3*a* of the aircraft 3. After docking the cab 6 with the aircraft 3, the operator operates the control panel 31 to expand the closure 63. This is merely one example of a general docking operation. Depending on, for example, the operator performing the docking, the docking of the cab 6** is not necessarily performed by the above-described manner.

When the cab 6 is in the state of being docked with the aircraft 3, the bumper 62 of the distal end part of the cab 6 may be in contact with the aircraft 3, or a slight gap that would not hinder walking between the cab 6 and the aircraft 3 may be formed between the bumper 62 and the aircraft 3.

Next, in the case of undocking the passenger boarding bridge 1 from the aircraft 3 and returning the passenger boarding bridge 1 to the standby position, after contracting the closure 63, the operator causes the travel device 10 to travel straight backward to undock the cab 6 from the door **3*a*, and keeps the travel device 10 traveling straight backward until the cab 6 comes into proximity to the aforementioned target position. Thereafter, the operator causes the travel device 10 to travel backward to bring the passenger boarding bridge 1** to the standby position.

It should be noted that controller 50 uses an XY orthogonal coordinate system as shown in FIG. 1 to recognize the position (coordinates) of each part of the passenger boarding bridge 1. In this example, the center point of the rotunda 4 (the position of the rotational axis CL1) is set as an origin (0, 0), and based thereon, an X-axis and a Y-axis are set as shown in FIG. 1.

In the present embodiment, during a period from when the cab 6 starts being moved from the standby position until the cab 6 is docked with the aircraft 3, while the travel wheels 9 are traveling backward in accordance with an input of a backward travel command from the operating device 30, the controller 50 performs a determination process to determine whether or not there is a possibility that the cab 6 comes closer to the aircraft 3 to get docked with the aircraft 3 as a result of the travel wheels 9 traveling backward (a function of the determiner 51). In a case where the controller 50 determines that there is a possibility that the cab 6 comes closer to the aircraft 3 to get docked with the aircraft 3 as a result of the backward travel, the controller 50, for example, gives a warning to the operator and/or restricts the backward travel of the travel wheels 9.

Figure 4:
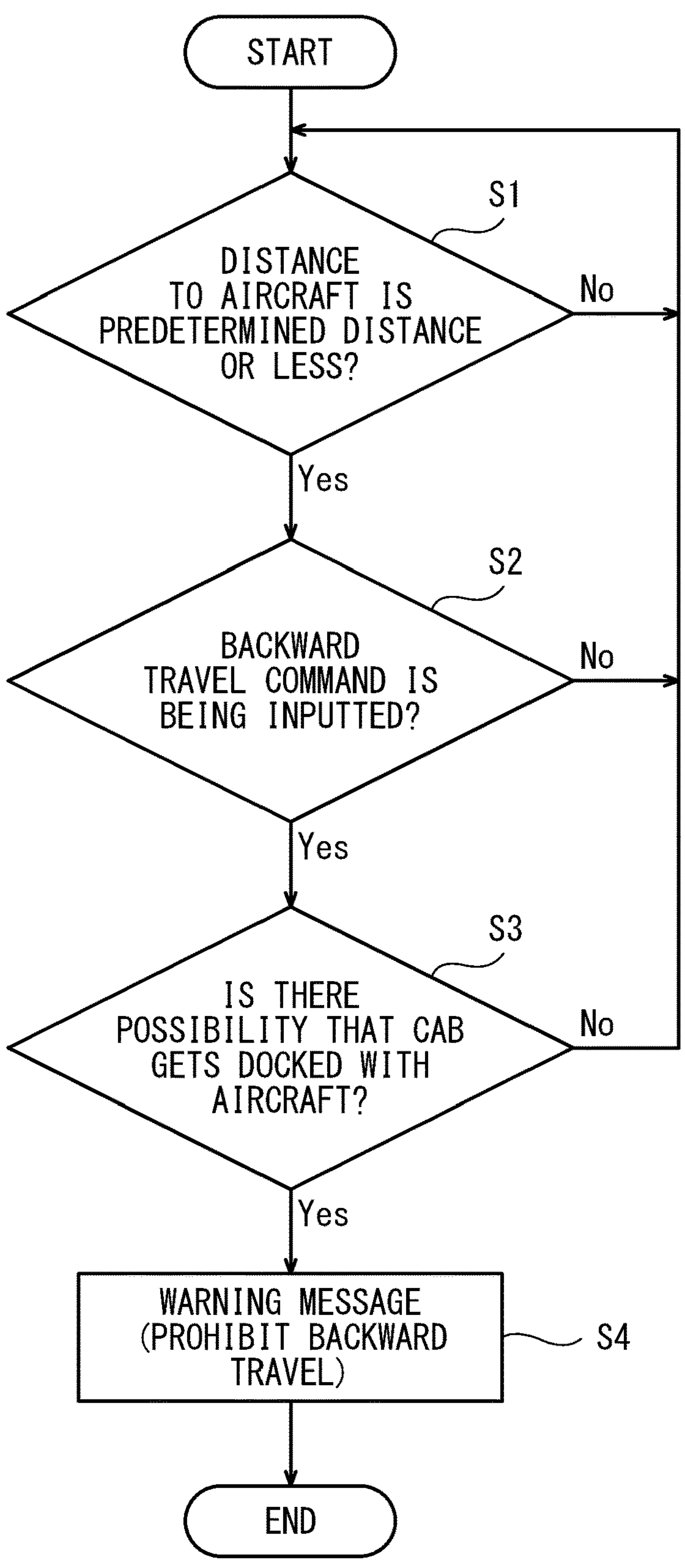
FIG. 4 is a flowchart showing one example of steps that a controller carries out when performing a determination process and its related processes.

FIG. 4 is a flowchart showing one example of steps that the controller 50 carries out when performing the above determination process and its related processes.

The processes shown in this flowchart are performed from when the passenger boarding bridge 1 (the cab 6) starts being moved from the standby position until the passenger boarding bridge 1 (the cab 6) is docked with the aircraft 3. It should be noted that the processes shown in this flowchart may be performed through the entire period from when the passenger boarding bridge 1 starts being moved from the standby position until it is docked with the aircraft 3. Alternatively, the processes shown in this flowchart may be performed in the second half of the period from when the passenger boarding bridge 1 starts being moved from the standby position until it is docked with the aircraft 3. For example, the "second half of the period" may start when a predetermined time has elapsed after the start of the moving of the cab 6 from the standby position, and may end when the docking of the cab 6 with the aircraft 3 is completed. Alternatively, assume a case where after the start of the moving of the cab 6 from the standby position until the cab 6 is docked with the aircraft 3, the cab 6 is operated by automatic control during the first half of the moving and the cab 6 is operated by manual control during the second half of the moving, the manual control being performed through operations by an operator. In this case, the "second half of the period" may be a period in which the cab 6 is operated by the manual control.

When the operator uses the operating device 30 of the control panel 31 to start an operation for causing the passenger boarding bridge 1 standing by at the standby position to move from the standby position in order to dock the cab 6 with the aircraft 3, the controller 50 determines whether or not the distance between the cab 6 (the distal end part of the cab 6) and the aircraft 3 is a predetermined distance or less (e.g., 1 m or less) (step S1).

In step S1, the controller 50 obtains the distance between the cab 6 and the aircraft 3, for example, based on values detected by the respective two distance sensors 23 provided on the distal end of the cab 6. In this case, an average of the distances detected by the respective two distance sensors 23 may be obtained as the distance between the cab 6 and the aircraft 3, or a smaller one of the distances detected by the respective two distance sensors 23 may be obtained as the distance between the cab 6 and the aircraft 3. The distal end of the cab 6 may be provided with another sensor. This sensor may detect that the distance from the sensor to the forward physical object (i.e., the aircraft 3) has become the aforementioned predetermined distance (e.g., a distance-settable photoelectric sensor). Based on an output signal from the sensor, the controller 50 may determine whether or not the distance between the cab 6 and the aircraft 3 is the predetermined distance or less.

In a case where the distance between the cab 6 and the aircraft 3 is the predetermined distance or less (Yes in step S1), the controller 50 determines whether or not a backward travel command is being inputted from the operating device 30 (step S2). If it is determined that no backward travel command is being inputted from the operating device (No in step S2), the controller 50 returns to step S1 to repeat the processing.

On the other hand, if it is determined that a backward travel command is being inputted to cause the travel wheels 9 to travel backward (Yes in step S2), the controller 50 performs a determination process to determine whether or not there is a possibility that the cab 6 comes closer to the aircraft 3 to get docked with the aircraft 3 as a result of the travel wheels 9 traveling backward (step S3).

If the result of the determination process in step S3 indicates that there is no possibility that the cab 6 gets docked with the aircraft 3 (No in step S3), the controller 50 returns to step S1 to repeat the processing.

On the other hand, if the result of the determination process in step S3 indicates that there is a possibility that the cab 6 gets docked with the aircraft 3 (Yes in step S3), the controller 50 causes the display device 34 of the control panel 31 to display a warning message, and invalidates the backward travel command to stop the travel wheels 9 from traveling backward (step S4). The warning message may be a message notifying that backward travel or backward docking should not be performed, for example, "Do not travel backward." Such a warning message may be outputted as an audio message from a speaker (not shown) provided on, for example, the control panel 31. At the time, a warning sound may be outputted by a buzzer (not shown) provided on, for example, the control panel 31. Consequently, in this case, the operator performs an operation to cause the travel wheels 9 to travel forward. At the time, the facing direction of the travel wheels 9 (i.e., the travel direction) can be changed.

As described in the above operation example, during a period from when the cab 6 starts being moved from the standby position until the cab 6 is docked with the aircraft 3, if the distance between the cab 6 and the aircraft 3 becomes the predetermined distance or less while the travel wheels 9 are traveling backward, then the determination process in step S3 is performed. If it is determined in step S3 that there is a possibility that the cab 6 comes closer to the aircraft 3 to get docked with the aircraft 3, a warning is given to the operator and the backward travel is stopped, and thereby docking of the cab 6 with the aircraft 3 by the backward travel of the travel wheels 9 can be avoided.

The order of these steps S1 and S2 in FIG. 4 may be reversed. The process of step S1 may be eliminated. However, as described in the above operation example, if the backward travel is restricted in step S4 in a case where it is determined Yes in steps S2 and S3 when the distance between the cab 6 and the aircraft 3 has become the predetermined distance or less, it is easier for the operator to operate the passenger boarding bridge 1. Accordingly, in the case of eliminating the process of step S1, only a warning may be given in step S4 by outputting, for example, a warning message.

In a case where the distance between the cab 6 and the aircraft 3 is greater than the predetermined distance, when a backward travel command is being inputted to cause the travel wheels 9 to travel backward, the determination process of step S3 may be performed, and if the determination result indicates that there is a possibility that the cab 6 comes closer to the aircraft 3 to get docked with the aircraft 3, then only a warning, such as a warning message, may be given. Thereafter, when the distance between the cab 6 and the aircraft 3 has become the predetermined distance or less, not only is the warning given, but the backward travel may also be restricted as in step S4.

First Example of Determination Process

Hereinafter, a first example of the determination process performed in step S3 by the controller 50 (the determiner 51) is described further with reference to, for example, FIG. 5 and FIG. 6.

Figure 5:
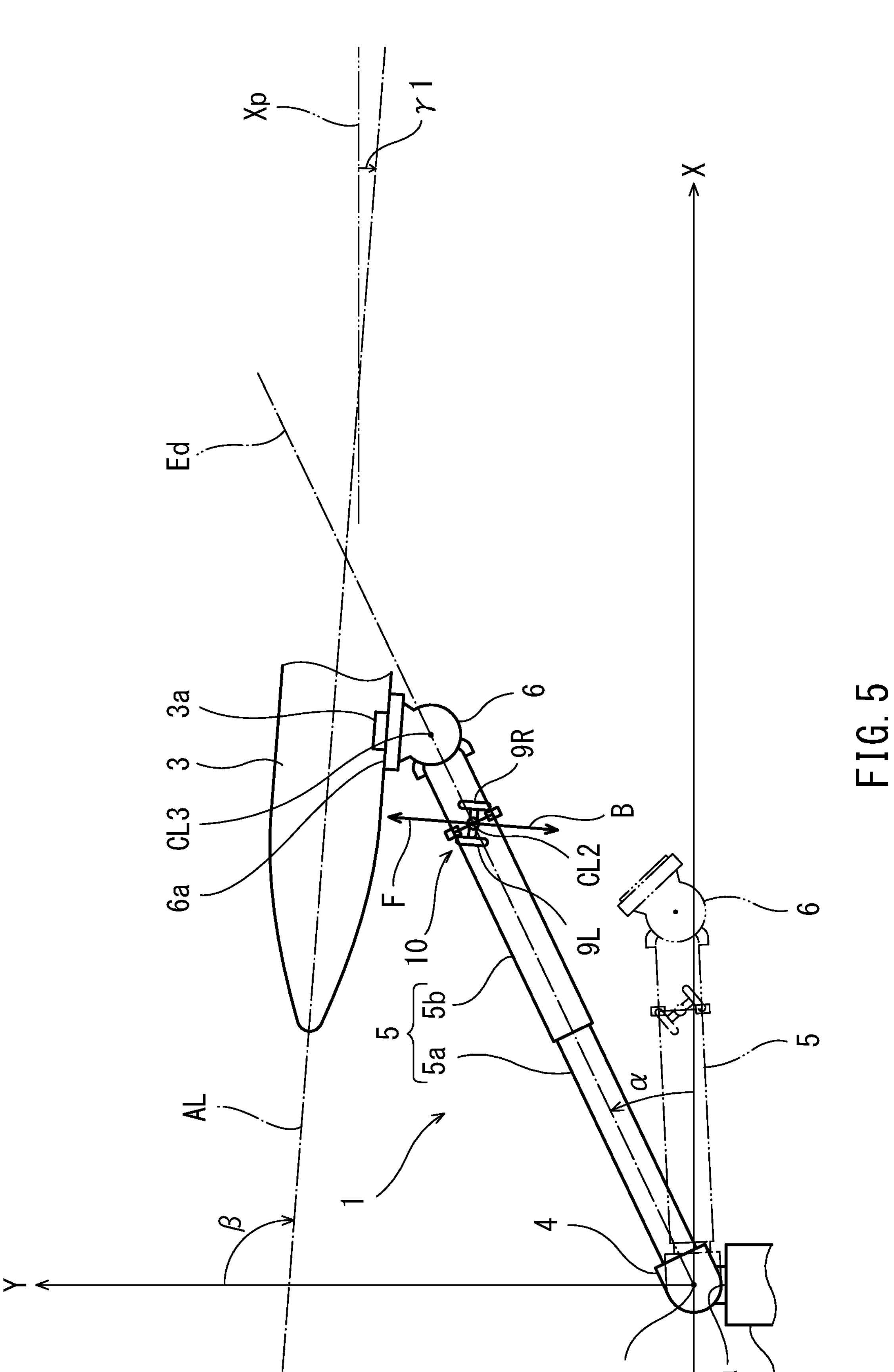
FIG. 5 is a schematic plan view showing one example where the passenger boarding bridge is in the state of being docked with the aircraft in a case where a door of the aircraft is located in a first quadrant.

FIG. 5 and FIG. 6 are schematic plan views each showing an example where the passenger boarding bridge 1 (the cab 6) is in the state of being docked with the aircraft 3. FIG. 5 shows one example where the entrance (the door 3*a*), which is a part of the aircraft 3 with which the cab 6 is to be docked, is located in the first quadrant of the XY orthogonal coordinate system (i.e., located in a region where both X and Y coordinates are positive values). FIG. 6 shows one example where the entrance (the door 3*a*) of the aircraft 3 is located in the second quadrant of the XY orthogonal coordinate system (i.e., located in a region where the X coordinate is a negative value and the Y coordinate is a positive value). Each of FIG. 5 and FIG. 6 is a transparent view in which the travel device 10 is illustrated by solid line.

In the XY orthogonal coordinate system herein, the position of the rotational center (CL1) of the rotunda 4 is set as an origin, and the regions that are located on the opposite side of the origin from the entrance 2*a* of the terminal building 2 are defined as the first quadrant and the second quadrant. Specifically, in a plan view, the X-axis is set in parallel to an end surface of the entrance 2*a* of the terminal building 2, and the Y-axis is set perpendicularly to the end surface of the entrance 2*a*. The rotunda 4 is configured to be rotatable within the range of −90 degrees to +90 degrees with respect to the Y-axis.

The passenger boarding bridge 1 shown in each of FIGS. 5 and 6 is in the state of being docked with the aircraft 3 by a basic docking operation (i.e., basic docked state). In the case of the basic docked state, the passenger boarding bridge 1 is docked with the aircraft 3 by forward travel, such that the travel direction of the travel wheels 9 (9L, 9R) is perpendicular to the fuselage guide line AL. An arrow F indicates the forward travel direction of the travel wheels 9, and an arrow B indicates the backward travel direction of the travel wheels 9.

In each of FIG. 5 and FIG. 6, a center line Ed of the tunnel unit 5 extending in the longitudinal direction of the tunnel unit 5 is drawn. In FIG. 5, for the sake of convenience, a parallel line Xp parallel to the X-axis is drawn.

It should be noted that, in the description below, for example, when an angle formed by a direction A and a direction B is referred to, this angle corresponds to an angle formed by a directional vector indicating the direction A and a directional vector indicating the direction B.

The manner in which the determiner 51 performs the determination differs between a case where the door 3*a* of the aircraft 3 is located in the first quadrant as shown in, for example, FIG. 5 and a case where the door 3*a* of the aircraft 3 is located in the second quadrant as shown in, for example, FIG. 6. The cab 6 is docked with the door 3*a* on the port side of the aircraft 3 as shown in FIG. 5 and FIG. 6.

First, the first example of the determination process performed by the determiner 51 in a case where the door 3*a* of the aircraft 3 is located in the first quadrant as illustratively shown in FIG. 5 is described.

In FIG. 5, $\gamma 1$ is, in a plan view, an angle formed by the X-axis positive direction and a direction from the front to the back of the aircraft 3 along the fuselage guide line AL, the angle being calculated with respect to the X-axis while defining the clockwise direction as the positive direction. Also, $\beta$ is, in the plan view, an angle formed by the Y-axis positive direction and the direction from the front to the back of the aircraft 3 along the fuselage guide line AL, the angle being calculated with respect to the Y-axis while defining the clockwise direction as the positive direction. These angles $\gamma 1$ and $\beta$ are set such that each of the absolute values thereof is within the range of 0 to 180 degrees.

Figure 7A:
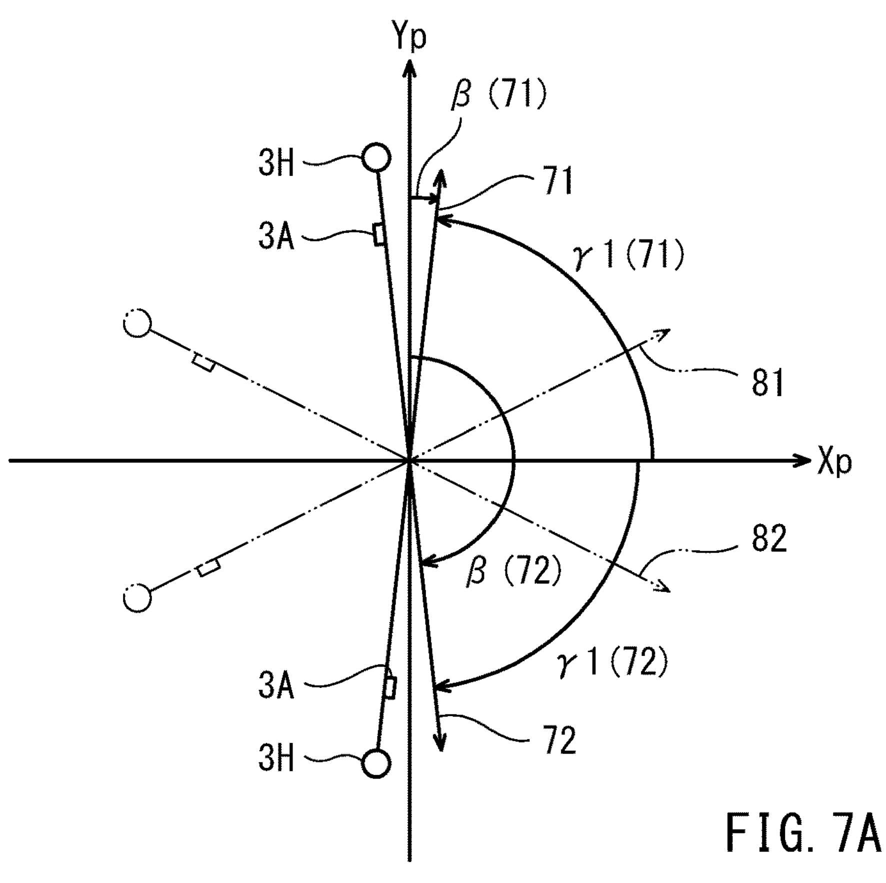
FIG. 7A is a diagram for describing various fuselage guide lines in a case where the door of the aircraft is located in the first quadrant.

FIG. 7A is a diagram for describing various fuselage guide lines in a case where the door 3*a* of the aircraft 3 is located in the first quadrant. In FIG. 7A, Xp is a parallel line parallel to the X-axis, and Yp is a parallel line parallel to the Y-axis. Each of arrows 71 and 72 indicates a fuselage guide line, and each of the directions of the arrows 71 and 72 is the direction from the front to the back of the aircraft 3 stopped on the fuselage guide line. Assuming that each of the arrows 71 and 72 simulates the aircraft 3, the front of the aircraft 3 is denoted by a reference sign 3H, and the door 3*a* on the port side of the aircraft 3 is denoted by a reference sign 3A.

Although not precisely illustrated in FIG. 7A, an angle $\gamma 1$ (71), which is the angle $\gamma 1$ relating to the fuselage guide line indicated by the arrow 71, is −80 degrees; an angle $\gamma 1$ (72), which is the angle $\gamma 1$ relating to the fuselage guide line indicated by the arrow 72, is 80 degrees; an angle (71), which is the angle $\beta$ relating to the fuselage guide line indicated by the arrow 71, is 10 degrees; and an angle $\beta$ (72), which is the angle $\beta$ relating to the fuselage guide line indicated by the arrow 72, is 170 degrees.

In a case where the door 3*a* of the aircraft 3 is located in the first quadrant (including the aforementioned example), at an airport, usually, the position of each fuselage guide line AL is set such that $-90<\gamma 1<90$ and $0<\beta<180$. This case includes, for example, not only the fuselage guide lines indicated by the arrows 71 and 72, but also fuselage guide lines indicated by arrows 81 and 82.

In the case of docking the cab 6 with the door 3*a* located in the first quadrant, for example, as shown in FIG. 5, the cab 6 is moved from the standby position indicated by two-dot chain line in such a direction as to increase the Y coordinate value to get docked with the door 3*a*.

Therefore, in this case, for example, during a period from when the cab 6 starts being moved from the standby position until the cab 6 is docked with the aircraft 3, if there is a time in which the travel wheels 9 are caused to travel backward, then, during the time, the determiner 51 calculates the Y coordinate value of the current position of the center point of the pair of travel wheels 9 multiple times sequentially at predetermined time intervals (at predetermined periods), and determines whether or not there is a possibility that the cab 6 comes closer to the aircraft 3 to get docked with the aircraft 3 based on whether or not the Y coordinate value of the current position, which is calculated multiples times sequentially, increases. Specifically, in a case where the Y coordinate value of the current position increases, the determiner 51 determines that the cab 6 is moving in a direction to come closer to the aircraft 3 by the backward travel and there is a possibility that the cab 6 gets docked with the aircraft 3 as a result of the backward travel, whereas in a case where the Y coordinate value does not increase, the determiner 51 determines that there is no possibility that the cab 6 gets docked with the aircraft 3 as a result of the backward travel.

A Y coordinate value (Yi) of the center point of the pair of travel wheels 9 can be calculated, for example, with an equation shown below by using a distance (Li) from the center point of the rotunda 4 to the center point of the pair of travel wheels 9 and a rotational angle $\alpha$ of the rotunda 4.

$$Yi=Li\times\sin\alpha$$

The distance Li is calculated from a measurement value of the distance sensor 28. The rotational angle $\alpha$ of the rotunda 4 is an angle that is formed by the center line Ed of the tunnel unit 5, the angle being calculated counterclockwise with respect to the X-axis. The rotational angle $\alpha$ is detected by the rotunda angle sensor 24. The rotunda 4 is configured to be rotatable such that the rotational angle $\alpha$ is within the range of $0\leq\alpha\leq 180$ (degrees).

Next, the first example of the determination process performed by the determiner 51 in a case where the door 3*a* of the aircraft 3 is located in the second quadrant is described.

In FIG. 6, $\gamma 2$ is, in a plan view, an angle formed by the X-axis negative direction and the direction from the front to the back of the aircraft 3 along the fuselage guide line AL, the angle being calculated with respect to the X-axis while defining the clockwise direction as the positive direction. The angle $\theta$ in FIG. 6 is the same as the angle $\theta$ in FIG. 5. These angles $\gamma 2$ and $\beta$ are set such that each of the absolute values thereof is within the range of 0 to 180 degrees. The angle $\gamma 1$ in FIG. 5 is an angle formed by the direction from the front to the back of the aircraft 3 along the fuselage guide line AL with respect to the X-axis positive direction. On the other hand, the angle $\gamma 2$ in FIG. 6 is an angle formed by the direction from the front to the back of the aircraft 3 along the fuselage guide line AL with respect to the X-axis negative direction. Accordingly, the angles $\gamma 1$ and $\gamma 2$ can be converted into each other by using the following relationship: $\gamma 2=\gamma 1+180$ (degrees).

Figure 7B:
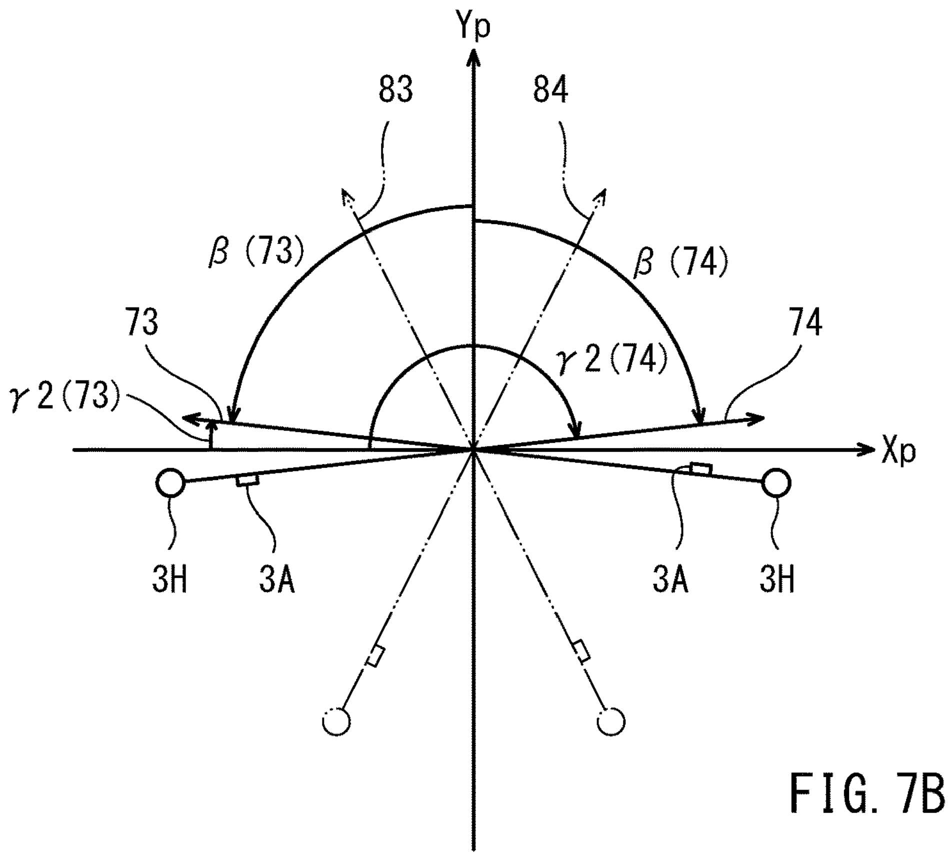
FIG. 7B is a diagram for describing various fuselage guide lines in a case where the door of the aircraft is located in the second quadrant.

FIG. 7B is a diagram for describing various fuselage guide lines in a case where the door 3*a* of the aircraft 3 is located in the second quadrant. In FIG. 7B, similar to FIG. 7A, each of arrows 73 and 74 indicates a fuselage guide line, and each of the directions of the arrows 73 and 74 is the direction from the front to the back of the aircraft 3 stopped on the fuselage guide line. Assuming that each of the arrows 73 and 74 simulates the aircraft 3, the front of the aircraft 3 is denoted by a reference sign 3H, and the door 3*a* on the port side of the aircraft 3 is denoted by a reference sign 3A.

Although not precisely illustrated in FIG. 7B, an angle $\gamma 2$ (73), which is the angle $\gamma 2$ relating to the fuselage guide line indicated by the arrow 73, is 10 degrees; an angle $\gamma 2$ (74), which is the angle $\gamma 2$ relating to the fuselage guide line indicated by the arrow 74, is 170 degrees; an angle $\beta$ (73), which is the angle $\beta$ relating to the fuselage guide line indicated by the arrow 73, is −80 degrees; and an angle $\beta$ (74), which is the angle $\beta$ relating to the fuselage guide line indicated by the arrow 74, is 80 degrees.

In a case where the door 3*a* of the aircraft 3 is located in the second quadrant (including the aforementioned example), at an airport, usually, the position of each fuselage guide line AL is set such that $0<\gamma 2<180$ and $-90<\beta<90$. This case includes, for example, not only the fuselage guide lines indicated by the arrows 73 and 74, but also fuselage guide lines indicated by arrows 83 and 84.

It is understood with reference to FIG. 7A and FIG. 7B that if the angle $\beta$ relating to the fuselage guide line is $0<\beta<90$, there are two possibilities, one of which is that the door 3*a* of the aircraft 3 is located in the first quadrant (see the arrows 71 and 81), and the other is that the door 3*a* of the aircraft 3 is located in the second quadrant (see the arrows 74 and 84).

In the case of docking the cab 6 with the door 3*a* located in the second quadrant, for example, as shown in FIG. 6, the cab 6 is moved from the standby position indicated by two-dot chain line in such a direction as to decrease the X coordinate value to get docked with the door 3*a*.

Therefore, in this case, for example, during a period from when the cab 6 starts being moved from the standby position until the cab 6 is docked with the aircraft 3, if there is a time in which the travel wheels 9 are caused to travel backward, then, during the time, the determiner 51 calculates the X coordinate value of the current position of the center point of the pair of travel wheels 9 multiple times sequentially at predetermined time intervals (at predetermined periods), and determines whether or not there is a possibility that the cab 6 comes closer to the aircraft 3 to get docked with the aircraft 3 based on whether or not the X coordinate value of the current position, which is calculated multiple times sequentially, decreases. Specifically, in a case where the X coordinate value of the current position decreases, the determiner 51 determines that the cab 6 is moving in a direction to come closer to the aircraft 3 by the backward travel and there is a possibility that the cab 6 gets docked with the aircraft 3 as a result of the backward travel, whereas in a case where the X coordinate value does not decrease, the determiner 51 determines that there is no possibility that the cab 6 gets docked with the aircraft 3 as a result of the backward travel.

An X coordinate value (Xi) of the center point of the pair of travel wheels 9 can be calculated, for example, with an equation shown below by using the distance (Li) from the center point of the rotunda 4 to the center point of the pair of travel wheels 9 and the rotational angle $\alpha$ of the rotunda 4. The distance (Li) is calculated from a measurement value of the distance sensor 28, and the rotational angle $\alpha$ is detected by the rotunda angle sensor 24.

$$Xi = Li \times \cos \alpha$$

In the above description, the XY coordinate values of the center point of the pair of travel wheels 9 during the traveling are calculated based on a detection value of the detector (the distance sensor 28) that detects the length of the tunnel unit 5 and a detection value of the detector (the rotunda angle sensor 24) that detects the rotational angle $\alpha$ of the rotunda 4. Alternatively, the XY coordinate values of the center point of the pair of travel wheels 9 during the traveling may be calculated based on the XY coordinate values of the center point of the pair of travel wheels 9 at a predetermined standby position (i.e., known coordinate values), the travel direction of the pair of travel wheels 9, and the rotation speed of the pair of travel wheels 9.

In the above-described determination process, whether or not there is a possibility that the cab 6 gets docked with the aircraft 3 is determined based on a change in the coordinate value (Y or X coordinate value) of the center point of the pair of travel wheels 9 during the backward travel. However, the determination may be made not based on the coordinate value of the center point of the pair of travel wheels 9, but based on the coordinate value of a predetermined part of the travel device 10 different from the center point of the pair of travel wheels 9, the coordinate value of a predetermined part of the tunnel unit 5, or the coordinate value of a predetermined part of the cab 6 (e.g., the center point of the cab 6).

It should be noted that whether the door 3*a* of the aircraft 3, with which the cab 6 is to be docked, is located in the first quadrant region or in the second quadrant region is scheduled in advance, and information about the schedule is prestored in the storage unit of the controller 50. In a case where the passenger boarding bridge 1 is assumed to be used for a plurality of types of aircrafts, specifically, used for an aircraft of one aircraft type whose door is to be located in the first quadrant region and also for an aircraft of another aircraft type whose door is to be located in the second quadrant region, information about in which region (i.e., the first quadrant region or the second quadrant region) the door of each aircraft is to be located (i.e., region specifying information) is stored in the storage unit of the controller 50 in association with the aircraft type of each aircraft. In this case, an operator pushes an aircraft type selection button (not shown) of the operating device 30 to select the aircraft type of the aircraft 3 before starting moving the passenger boarding bridge 1 from the standby position, thereby inputting information about the selected aircraft type to the controller 50. Based on the selected aircraft type and the aforementioned region specifying information, the controller 50 can determine whether the door of the aircraft is located in the first quadrant region or in the second quadrant region.

The XY orthogonal coordinate system is not limited to the one illustratively shown in FIG. 1, FIG. 5, and FIG. 6, but may be any orthogonal coordinate system (e.g., XY orthogonal coordinate system) in which the center point (the position of the rotational center) of the rotunda 4 is used as the origin (0, 0). Then, during backward travel of the travel wheels 9, whether or not there is a possibility that the cab 6 gets docked with the aircraft 3 may be determined based on a change in the coordinate values of the current position of a predetermined part (e.g., the center point of the pair of travel wheels 9) in the XY orthogonal coordinate system, the coordinate values being calculated multiples times sequentially. In this case, specifically, a region corresponding to the first quadrant of the above XY orthogonal coordinate system and a region corresponding to the second quadrant thereof are preset as a first region and a second region, respectively. Then, if the door 3*a* of the aircraft 3 is located in the first region, whether or not there is a possibility that the cab 6 gets docked with the aircraft 3 may be determined based on whether or not, during the backward travel of the travel wheels 9, the coordinate values of the current position of the predetermined part in the XY orthogonal coordinate system, the coordinate values being calculated multiple times sequentially, change in such a manner that the Y coordinate value of the current position in the XY orthogonal coordinate system increases. On the other hand, if the door 3*a* of the aircraft 3 is located in the second region, whether or not there is a possibility that the cab 6 gets docked with the aircraft 3 may be determined based on whether or not, during the backward travel of the travel wheels 9, the coordinate values of the current position of the predetermined part in the XY orthogonal coordinate system, the coordinate values being calculated multiple times sequentially, change in such a manner that the X coordinate value of the current position in the XY orthogonal coordinate system decreases.

Second Example of Determination Process

Next, a second example of the determination process in step S3 is described. When the operator operates the operating device 30 to move the cab 6 from the standby position to dock the cab 6 with the aircraft 3, usually, the operator causes the travel wheels 9 to travel such that the distal end of the cab 6 faces in the direction of the aircraft 3, thereby moving the cab 6. Therefore, in the second example of the determination process, the determination is made by using measurement values of the distance sensors 23, which are provided at the distal end of the cab 6 and each of which measures the distance between the cab 6 and the aircraft 3.

In this determination process, whether or not there is a possibility that the cab 6 comes closer to the aircraft 3 to get docked with the aircraft 3 is determined based on whether or not, during backward travel of the travel wheels 9, the distance between the cab 6 and the aircraft 3, which is measured multiple times sequentially at predetermined time intervals (at predetermined periods) by each distance sensor 23, decreases. Specifically, in a case where the distance between the cab 6 and the aircraft 3 decreases, the determiner 51 determines that the cab 6 is moving in a direction to come closer to the aircraft 3 by the backward travel and there is a possibility that the cab 6 gets docked with the aircraft 3 as a result of the backward travel, whereas in a case where the distance between the cab 6 and the aircraft 3 does not decrease, the determiner 51 determines that there is no possibility that the cab 6 gets docked with the aircraft 3 as a result of the backward travel.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a passenger boarding bridge capable of avoiding a situation where a cab thereof is docked with an aircraft by backward travel of travel wheels.

REFERENCE CHARACTERS LIST

1 passenger boarding bridge
2 terminal building
3 aircraft
3*a* door
4 rotunda
5 tunnel unit
6 cab
8 lifting/lowering device
9, 9L, 9R travel wheel
10 travel device
30 operating device
50 controller
51 determiner
AL fuselage guide line

The invention claimed is:

1. A passenger boarding bridge comprising:

a rotunda connected to an entrance of a terminal building and supported such that the rotunda is rotatable horizontally;

a tunnel unit including a first end and a second end, the first end being connected to the rotunda, the tunnel unit being extendable and retractable;

a cab provided at the second end of the tunnel unit, the cab being configured to be docked with an aircraft;

a travel device that supports the tunnel unit and includes a pair of travel wheels, the travel device being configured to travel forward in a first direction by regular rotation of the pair of travel wheels and to travel backward in a second direction opposite to the first direction by reverse rotation of the pair of travel wheels, wherein the first direction is a direction along which movement of the travel device causes the tunnel unit to be extended, and the second direction is a direction along which movement of the travel device causes the tunnel unit to retract;

an operating device that is manually operated to input an operation command to the travel device; and a controller including a processing unit and a storage unit that stores a control program, wherein when the processing unit executes the control program, the control program causes the controller to, during a period from when the cab starts being moved from a predetermined position through an operation of the operating device to cause the travel device to travel, until the cab is docked with the aircraft, while the travel device is traveling backward in the second direction in accordance with a manual control input of a backward travel operation command from the operating device, determine whether or not the cab comes closer to the aircraft as a result of the travel device traveling backward in the second direction, wherein the passenger boarding bridge is configured to perform a warning and/or stop the travel device from traveling backward in the second direction in a case where the controller determines that the cab comes closer to the aircraft as a result of the travel device traveling backward in the second direction, thereby avoiding the cab becoming docked with the aircraft by backward travel of the travel wheels.

2. The passenger boarding bridge according to claim 1, wherein the controller is configured to:

while the travel device is traveling backward in the second direction, calculate, multiple times sequentially, a coordinate value of a current position of a predetermined part of one of the tunnel unit, the cab, or the travel device by using an orthogonal coordinate system having an origin that is a position of a rotational center of the rotunda in a plan view; and determine whether or not the cab comes closer to the aircraft as a result of the travel device traveling backward in the second direction, based on a change in the coordinate value of the current position of the predetermined part, the coordinate value being calculated multiples times sequentially.

3. The passenger boarding bridge according to claim 2, wherein as the orthogonal coordinate system, an XY orthogonal coordinate system having the origin that is the position of the rotational center of the rotunda in the plan view is preset such that, in the XY orthogonal coordinate system, regions that are located on an opposite side of an X-axis from the entrance of the terminal building are a first quadrant and a second quadrant, the X-axis being set in parallel to an end surface of the entrance of the terminal building, and the controller is configured to:

in a case where an entrance, of the aircraft, with which the cab is to be docked is scheduled to be located in the first quadrant, while the travel device is traveling backward in the second direction, calculate, multiple times sequentially, a Y coordinate value of the current position of the predetermined part of one of the tunnel unit, the cab, or the travel device by using the XY orthogonal coordinate system; and determine whether or not the cab comes closer to the aircraft as a result of the travel device traveling backward in the second direction, based on whether or not the Y coordinate value of the current position, the Y coordinate value being calculated multiple times sequentially, increases.

4. The passenger boarding bridge according to claim 3, wherein the controller is configured to:

in a case where the entrance, of the aircraft, with which the cab is to be docked is scheduled to be located in the second quadrant, while the travel device is traveling backward in the second direction, calculate, multiple times sequentially, an X coordinate value of the current position of the predetermined part by using the XY orthogonal coordinate system; and determine whether or not the cab comes closer to the aircraft as a result of the travel device traveling backward in the second direction, based on whether or not the X coordinate value of the current position, the X coordinate value being calculated multiple times sequentially, decreases.

5. The passenger boarding bridge according to claim 2, wherein as the orthogonal coordinate system, an XY orthogonal coordinate system having the origin that is the position of the rotational center of the rotunda in the plan view is preset such that, in the XY orthogonal coordinate system, regions that are located on an opposite side of an X-axis from the entrance of the terminal building are a first quadrant and a second quadrant, the X-axis being set in parallel to an end surface of the entrance of the terminal building, and the controller is configured to:

in a case where an entrance, of the aircraft, with which the cab is to be docked is scheduled to be located in the second quadrant, while the travel device is traveling in the second direction, calculate, multiple times sequentially, an X coordinate value of the current position of the predetermined part of one of the tunnel unit, the cab, or the travel device by using the XY orthogonal coordinate system; and determine whether or not the cab comes closer to the aircraft as a result of the travel device traveling backward in the second direction, based on whether or not the X coordinate value of the current position, the X coordinate value being calculated multiple times sequentially, decreases.

6. The passenger boarding bridge according to claim 1, further comprising a distance sensor that is mounted to the cab and that measures a distance between the cab and the aircraft, wherein the controller is configured to, while the travel device is traveling backward in the second direction, determine whether or not the cab comes closer to the aircraft as a result of the travel device traveling backward in the second direction, based on whether or not the distance between the cab and the aircraft, the distance being measured by the distance sensor, decreases.

7. The passenger boarding bridge according to claim 1, wherein the controller is configured to determine, when the distance between the cab and the aircraft has become a predetermined distance or less, whether or not the cab comes closer to the aircraft as a result of the travel device traveling backward in the second direction.

8. The passenger boarding bridge according to claim 1, further comprising a warning unit configured to perform the warning in the case where the controller determines that the cab comes closer to the aircraft as a result of the travel device traveling backward in the second direction.

9. The passenger boarding bridge according to claim 1, further comprising a warning unit configured to perform the warning, wherein while the travel device is traveling backward in the second direction, in the case where the controller determines that the cab comes closer to the aircraft as a result of the travel device traveling backward in the second direction:

when a distance between the cab and the aircraft is greater than a predetermined distance, the passenger boarding bridge does not stop the travel device from traveling backward in the second direction while the warning unit performs the warning, or when the distance between the cab and the aircraft has become the predetermined distance or less, the passenger boarding bridge stops the travel device from traveling backward in the second direction while the warning unit performs the warning.

10. The passenger boarding bridge according to claim 1, wherein a rudder angle of the travel device is changeable within a range of −90 degrees to +90 degrees with respect to a longitudinal direction of the tunnel unit.

11. The passenger boarding bridge according to claim 1, wherein when the controller determines that the cab comes closer to the aircraft as a result of the travel device traveling backward in the second direction, the controller invalidates the backward travel operation command to stop the travel wheels from traveling backward in the second direction.

* * * * *